No. 763,929. Patented June 28, 1904.

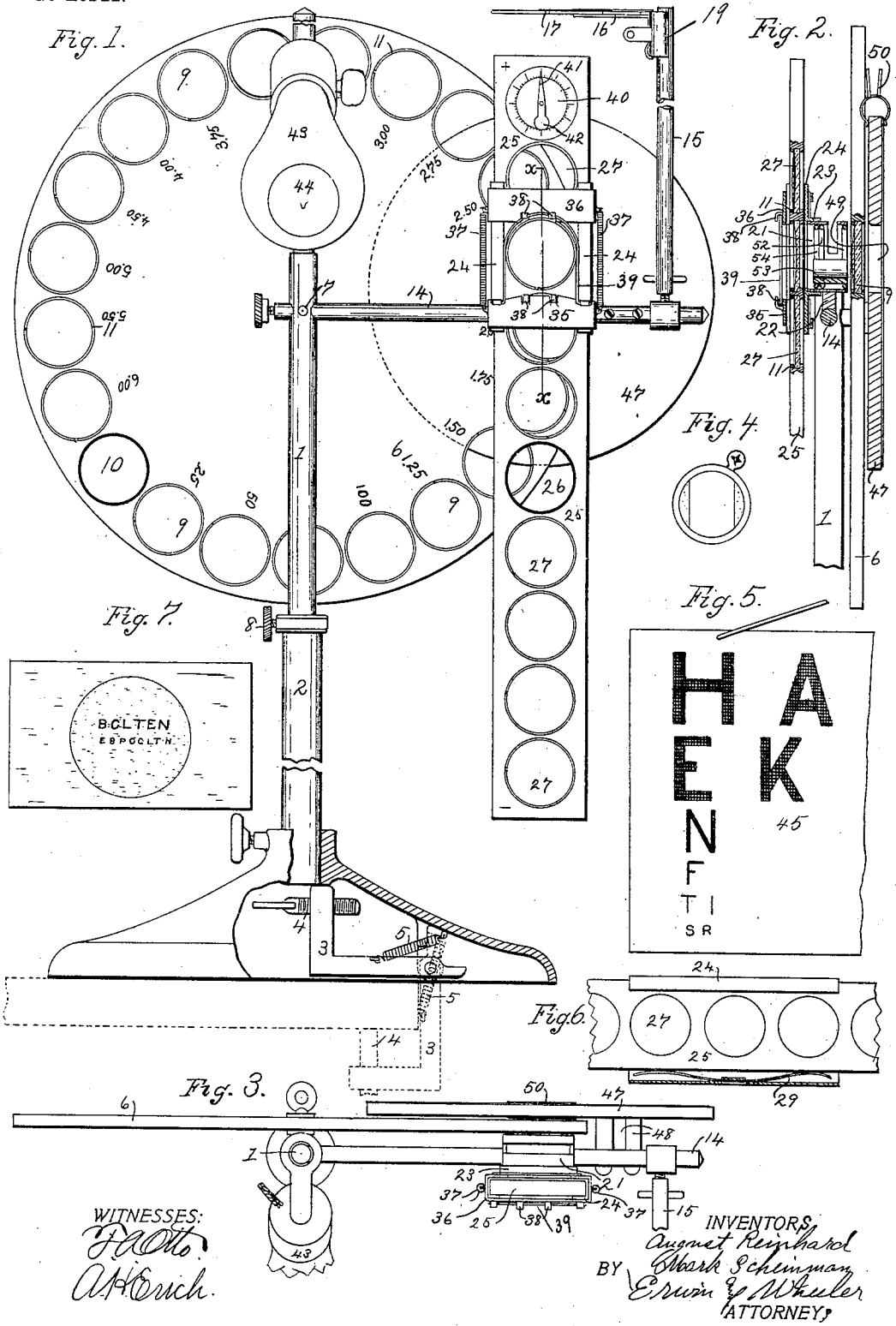

UNITED STATES PATENT OFFICE.

AUGUST REINHARD, OF MILWAUKEE, WISCONSIN, AND MARK SCHEINMAN, OF CHICAGO, ILLINOIS.

SIGHT-TESTING APPARATUS.

SPECIFICATION forming part of Letters Patent No. 763,929, dated June 28, 1904.

Application filed August 7, 1903. Serial No. 168,580. (No model.)

*To all whom it may concern:*

Be it known that we, AUGUST REINHARD, residing at Milwaukee, county of Milwaukee, and State of Wisconsin, and MARK SCHEINMAN, residing at Chicago, county of Cook, and State of Illinois, citizens of the United States, have invented new and useful Improvements in Sight-Test Apparatus, of which the following is a specification.

Our invention relates to improvements in sight-testing apparatus.

The invention is especially designed to be used by opticians and oculists in testing the sight of their patients, and has for its primary object the provision of means for adjusting a great variety of lenses of different size and character across the line of vision in a minimum number of planes and with the planes as closely contiguous to each other as possible, whereby the refraction of the rays between the several lenses used in making any given test will not be detrimental to the test.

A further object is to facilitate grouping the lenses in operative position, as well as the manipulation of the entire apparatus.

In the following description reference is had to the accompanying drawings, in which—

Figure 1 is a rear elevation of our invention, showing the base in section. Fig. 2 is a sectional view drawn on line $x$ $x$ of Fig. 1. Fig. 3 is a top view of the apparatus with the card-holder and clamp broken away. Fig. 4 is a detail view of one of the auxiliary lenses. Fig. 5 is a detail view of the transparency used in making the tests. Fig. 6 is a detail sectional view of one edge of the slide, showing the spring-bearing. Fig. 7 is a detail front view of the translucent card 17.

Like parts are identified by the same reference characters throughout the several views.

A supporting-standard is formed in telescoping sections 1 and 2, with an L-shaped bracket 3, pivotally secured to the base and provided with a set-screw 4, whereby the base may be clamped to the table or other convenient support.

5 is a spring to hold the clamping-bracket 3 in a normally elevated position and also to cause the bracket to swing to clamping position underneath a table or stand.

A set-screw 8 is used to hold the sections 1 and 2 in any desired position of adjustment.

A disk 6 is rotatably mounted on an axle 7, which projects from the upper standard-section, and this disk is provided near its periphery with apertures in which are fitted spherical lenses 9 of various degrees of convexity, the degree of curvature of each lens being represented by signs and figures on the disk adjacent thereto, as shown in Fig. 1. An aperture 10 is preferably left open and the lenses grouped with reference thereto in a graduated series. The disk is preferably formed of wood or other light material. The lenses are inserted in the apertures of the disk against an annular shoulder and held therein by resilient split rings 11, which fit annular grooves in the aperture-walls and bear against the edges of the lenses on the side opposite said shoulders, thus holding them in position.

The upper standard-section 1 is provided with an arm 14, which extends horizontally along the rear surface of the disk 6 and supports a card-holding rod 15, which is provided with an adjustable card-receiving bracket 16 at its outer end, designed to support a card 17 in the line of vision, extending through one of the lenses in the disk 6. The rod 15 is connected with the arm 14 by a coupling 19, which binds on the arm, or is provided with an ordinary set-screw to hold it in any desired position of adjustment. The sight of the patient is directed to the card through one of the lenses in the disk 6 and a sleeve 21, which is supported by a block 22 from the arm 14, and on the outer end of this sleeve is located a rotatable thimble 23, which carries a guide 24, adapted to receive and support a lens-carrying slide 25. The latter is provided with a central aperture 26 and a series of graduated lenses 27 on each side thereof, those on one side being concave and those on the other being convex. The guide 24 is formed to embrace the edges of the slide 25 and at one side is provided with a spring 29, which bears on the edge of the slide and by friction holds it in any position of adjustment, while permitting a free readjustment of the slide.

It is desirable to provide for the use of auxiliary lenses of both the spherical and cylindrical type, and the central upper portion of the sleeve 21 is therefore slotted to permit the insertion of independent lenses between the disk 6 and slide 25, the lenses so inserted being supported in the line of vision by the lower walls of the sleeve itself and the edges of the slot. This slot is for auxiliary spherical lenses. Where auxiliary cylindrical lenses are used, it is necessary that their axes should have a fixed relation to those of the slide-lenses. For this reason the auxiliary cylindrical lenses are provided with frosted margins on each side of their axes, leaving a substantially rectangular exposure of clear glass along the axis of each lens, as shown in Fig. 4. This facilitates the adjustment of each auxiliary lens in a position parallel to the slide-lenses.

The guide 24 is provided with brackets 35 and 36, which are relatively movable and connected by springs 37. These brackets are provided with lens-engaging lips 38, whereby a lens may be held in registry with the thimble 23. When the lens is removed, the brackets are held in separated position out of the line of vision by a wire yoke 39, pivoted to bracket 35 and formed to engage the lips 38 on the bracket 36. With this construction any rotation of the slide and its thimble 23 upon the sleeve 21 effects the same change in the inclination of the axis of the lens carried by the brackets 35 36 as that of the slide-lenses. The degree of this inclination is shown by a gravity-indicator, consisting of a dial 40 on the slide and a pointer 41, centrally pivoted thereon, with one end weighted, as indicated at 42.

A lamp 43, preferably of the incandescent electric type, is indicated on the standard 1 and the glass bulb thereof coated with opaque material, except that a space 44 is left uncoated, whereby all the light may be directed upon the card, the lamp being adjustably mounted on the standard for that purpose. If desired, however, a transparency 45 may be employed, the latter being hung in a window or other suitable place within the line of vision.

The apparatus is provided with a shield 47, which is supported from the arm 14 by rods 48 in a position to partially cover the front surface of the disk 6. This shield is provided with a sight-aperture 49, registering with the sleeve 21 and with the lenses of disk 6, which may be adjusted to the sleeve. The shield 47 is also provided with resilient clamps 50, whereby apertured sheets of paper 57 may be supported in front of the shield, with their apertures opposite the sight-apertures 49. Fresh sheets of similar paper are substituted for each successive patient for sanitary reasons.

It will be observed that the interior of the sleeve 21 is provided with rings 52. Where it is desired to use small auxiliary lenses, a removable segment 53 is inserted upon the rings 52, thus supporting the smaller lens at the center of sleeve 21. The segment 53 is provided with a ring 54, which abuts one of the rings and gives stability to the segment.

In use the patient is placed in front of the instrument, with one eye at the aperture in the shield 47. The disk 6 is rotated step by step to bring the lenses of the series carried by the disk successively in front of the eye of the patient, whose sight is directed through the aperture and the interposed lenses and sleeve 21 to the card or other object used in the test. To test for astigmatism, the slide 25 is adjusted step by step to bring the cylindrical lenses successively across the line of vision, auxiliary lenses being employed where necessary, as above explained.

Having thus described our invention, what we claim as new, and desire to secure by Letters Patent, is—

1. In apparatus of the described class, the combination of a sight sleeve or barrel; means for adjusting spherical lenses across one end thereof; a carrier for cylindrical lenses rotatably mounted on the other end of the sleeve and adjustable past the end thereof; and a gravity-finger loosely pivoted to the carrier, in coöperative relation to a suitable gage adapted to indicate the inclination of the axes of the lenses on said carrier.

2. In apparatus of the described class, a carrier for cylindrical lenses; a rotary support for said carrier; an indicating-finger pivotally secured to the carrier and weighted at one end and adapted to swing by gravity, and a dial in coöperative relation to the finger.

3. In apparatus of the described class, the combination of a sight-directing sleeve; a rotary thimble mounted thereon, a guide located on the thimble; a lens-carrier mounted to slide in said guide; brackets connected with the guide and provided with means for holding auxiliary lenses; and means for adjusting said brackets with reference to each other.

4. In apparatus of the described class the combination with a rotary support; of a carrier for cylindrical lenses mounted to slide thereon; a set of relatively movable brackets connected with the support; resilient connections between the brackets; and auxiliary-lens holders connected with the brackets and adapted to hold such lenses in registry with lenses on the carrier.

5. In apparatus of the described class the combination with a rotary support; of a carrier for cylindrical lenses mounted to slide thereon; a set of relatively movable brackets connected with the support; resilient connections between the brackets; and auxiliary-lens holders connected with the brackets and adapted to hold such lenses in registry with lenses on the carrier; together with a yoke pivoted to one bracket and adapted to be adjusted to engage and hold the other bracket against the tension of the resilient connections when the auxiliary lens is removed.

6. In apparatus of the described class, a lens-carrier; a supporting-sleeve, arranged for registry with the lenses of the carrier, and provided with a slot for the reception of auxiliary lenses; a removable segment, adapted for insertion in said sleeve below the slot to form a support for small lenses.

7. In apparatus of the described class, the combination with a sight-sleeve, of a lens-carrier rotatably supported thereby, and also adjustable transversely thereof; a second lens-carrier independently supported; and an auxiliary-lens holder insertible in the sleeve; said sleeve being slotted for the insertion of auxiliary lenses in the lens-holder.

8. In apparatus of the described class, the combination of a support; a lens-supporting carrier rotatably mounted thereon; a sight-sleeve connected with the support, in a line of sight cutting the path traveled by the lenses on the carrier; a shield crossing said line of sight and having an aperture in said line; paper-holding devices on said shield and a removable apertured paper shield supported thereby; together with a rotatable carrier for cylindrical lenses adjustable across said line of sight and a test-card supported beyond said lens-carrier.

9. In an apparatus of the described class, the combination with a lens-carrier; of a fixed apertured shield partially covering the same; a removable apertured shield, such as paper; and suitable holding devices connecting the removable with the fixed shield.

10. In apparatus of the described class, the combination of a suitable support; a lens-carrier and an interposed sight-tube; an adjustable card-holder adapted to be moved into and out of the line of sight through said tube; and an incandescent electric lamp mounted on the support, and having its bulb coated with opaque material except an aperture through which light may be directed to the vicinity of the card-holder.

11. In apparatus of the described class, the combination of a suitable support; lens-carriers mounted thereon; a base; a spring-controlled elbowed clamping-bar pivotally connected with the base, and a clamping set-screw, connected with said bar.

12. In apparatus of the described class, the combination with lens-carriers and sight-directing devices; of a translucent sheet of uniform transparency provided with opaque characters of various dimensions, adjustable in a line of sight extending through the lenses.

In testimony whereof we affix our signatures in the presence of witnesses.

AUGUST REINHARD.
MARK SCHEINMAN.

Witnesses as to the signature of August Reinhard:
LEVERETT C. WHEELER,
JAS. B. ERWIN.

Witnesses as to the signature of Mark Scheinman:
WILLIAM LAMKAY,
WOLF SCHEINMAN.